(12) United States Patent
Smock (10) Patent No.: US 9,852,581 B2
(45) Date of Patent: Dec. 26, 2017

(54) METHOD AWARDING PLAYTIME PROPORTIONAL TO TEST RESULTS (71) Applicant: Timothy J. Smock, Kentwood, MI (US)

(72) Inventor: Timothy J. Smock, Kentwood, MI (US)

(*) Notice: Subject to any disclaimer, the term of this patent is extended or adjusted under 35 U.S.C. 154(b) by 0 days.

(21) Appl. No.: 15/293,197

(22) Filed: Oct. 13, 2016

(65) Prior Publication Data

US 2017/0084119 A1   Mar. 23, 2017

Related U.S. Application Data

(63) Continuation-in-part of application No. 13/975,346, filed on Aug. 25, 2013, now abandoned, which is a continuation-in-part of application No. 13/605,954, filed on Sep. 6, 2012, now abandoned.

(60) Provisional application No. 61/573,341, filed on Sep. 6, 2011.

(51) Int. Cl.
| | |
|---|---|
| *G09B 7/02* | (2006.01) |
| *H04N 21/4784* | (2011.01) |
| *G07F 17/32* | (2006.01) |
| *G09B 7/00* | (2006.01) |
| *A63F 13/92* | (2014.01) |
| *A63F 13/73* | (2014.01) |

(52) U.S. Cl.
CPC ........ *G07F 17/3244* (2013.01); *A63F 13/73* (2014.09); *A63F 13/92* (2014.09); *G07F 17/3211* (2013.01); *G07F 17/3225* (2013.01); *G09B 7/00* (2013.01); *H04N 21/4784* (2013.01)

(58) Field of Classification Search
CPC .............................. G09B 7/02; H04N 21/4784
USPC ......................................................... 434/332
See application file for complete search history.

(56) References Cited

U.S. PATENT DOCUMENTS

| | | | |
|---|---|---|---|
| 2007/0037131 A1* | 2/2007 | Anderson | ................ G09B 7/00 434/323 |
| 2008/0182232 A1* | 7/2008 | Bannwolf | ................ G09B 7/02 434/350 |

* cited by examiner

*Primary Examiner* — Thomas Hong
(74) *Attorney, Agent, or Firm* — Chicago IP Law; Steven M. Evans (57) ABSTRACT

A method for awarding playtime credit proportional to positive performance on educational testing. The method records correct answers to academic questions, such as math, as credits towards time allowed on an attached electronic play device. The amount of time earned or awarded is determined by the number of correct answers provided in response to displayed questions.

16 Claims, 10 Drawing Sheets

3 2    Available play time is: _____________
+  2 2

METHOD AWARDING PLAYTIME PROPORTIONAL TO TEST RESULTS

REFERENCE TO RELATED APPLICATIONS

This patent application is a Continuation-in-Part of U.S. patent application Ser. No. 13/975,346, filed Aug. 25, 2013, which is a Continuation-in-Part of patent application Ser. No. 13/605,954, filed Sep. 6, 2012, entitled "Apparatus Awarding Playtime Proportional to Test Results," which claims priority to U.S. provisional patent application having application No. 61/573,341, filed on Sep. 6, 2011, entitled "Test 4 time." All the patent applications identified immediately above in this paragraph are hereby incorporated by reference.

BACKGROUND OF THE INVENTION

Field of the Invention

The present invention relates generally to controlling power to and video output from electronic game devices, and more particularly, to devices for controlling time available to play electronic games and watching television.

Description of Related Art

It is well-known that children enjoy playing video games and watching television. Many parents worry about the time their children spend during a day playing video games and watching television. If not monitored, some children will spend all their leisure time playing video games and watching television. Additionally, many parents worry their children are spending too much time playing video games and watching television, and not spending enough time on educational games and activities.

Accordingly, there exists a need to incentivize children to engage in educational activities while still limiting the amount of time children spend playing video games and watching television.

ASPECTS AND SUMMARY OF THE PRESENT INVENTION

In order to achieve these goals, one aspect of the present invention is to utilize a children's desire to play video games and watch television as means for encouraging educational activities.

Another aspect of the present invention is to award or reward children for positive performance on educational activities.

A further aspect of the present invention is to enable a child to practice his or her educational skills and be awarded playtime for successful performance on educational activities without the necessary involvement of a parent.

Another aspect of the present invention is to enable children to earn "playtime currency" or credits by successfully completing educational activities.

An additional aspect of the present invention is to build children's self-confidence and improve their fundamental math skills in adding, subtracting, multiplying and dividing, which will allow children to more easily move up the ladder of a mathematics curriculum.

Another aspect of the present invention is to provide an electrical power controlling apparatus that can be used on a myriad of electrically powered toys and games to control the amount of time children play on such toys and games.

A further aspect of the present invention is to provide a video or display signal output controlling apparatus that can be used on a myriad of video output games to control the amount of time children play on such electronic games.

In order to achieve these aspects, the present invention provides an automated reward apparatus for children learning mathematics and other educational subjects. The reward or "playtime currency" is timed use of an electronically powered or video outputting device for a given amount of time, such as a video game, a television, a computer, or any other electronically powered or video outputting device. In a preferred embodiment, the electronically powered or display outputting device providing timed use receives power from a standard alternating current (AC) outlet.

The present invention uses correct answers to academic questions, math for example, as credits towards time allowed on an attached device. The amount of time earned or awarded ("playtime currency") is determined by the number of correct answers provided in response to questions.

A preferred embodiment of the present invention consists of two main units. The first is a handheld unit or user interface. The user interface randomly generates questions for a user, typically a child, to answer. The user interface also records credits the user has accumulated for correct answers. At the user's request the user interface translates the credits into minutes of playing time. For instance, ten correct answers could translate into twenty minutes of usable time (two minutes per correct answer) on the device of their choice, such as a video game, computer, TV, or the like. After translating the credits into a time equivalent, that information is transmitted wirelessly to the second main unit, a power or display controller base station.

In accordance with a first embodiment of the present invention, a power controller base station is plugged into a standard AC wall socket. The electronic device the user is accumulating time for is plugged into the power controller base station. So if twenty minutes of credited time was sent to the power controller base station, then electricity will be allowed to flow to the electronic device, such as a video game, for twenty minutes. A timer inside of the power controller base station shuts off the flow of electricity at the end of the twenty minutes to the connected device, such as a video game. To gain more playtime, the process will begin again back on the user interface with the answering of more questions and building more time. There are different settings for grade level difficulty factors and also settings for time allowed for each credit.

In accordance with a second embodiment of the present invention, a video or display output controller base station is connected to the display or video output of an electric game, such as a video game. A user of the electronic game accumulates time usage during which a display signal that is outputted from the video game is passed through the display output controller base station to a display device, such as a television So, for example, if twenty minutes of credited time was sent to the display output controller base station from a video game, then the display output or video signal, such as from a video game, will be allowed to flow through the display output controller base station from the video game to the display device, such as a television or a video monitor. A timer inside the display output controller base station shuts off the display signal at the end of the twenty minutes to the display device. In order obtain more playtime, the process will begin again back on the user interface with the answering of more questions and building more time. There are different settings for grade level difficulty factors and also settings for time allowed for each level.

Figure 10A:
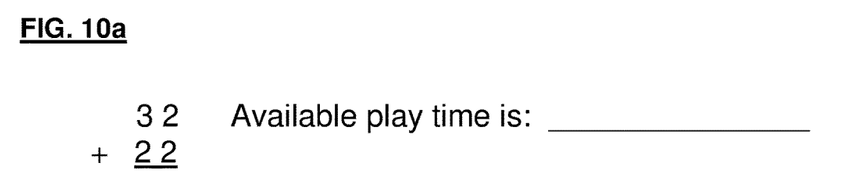
FIGS. 10a, 10b, and 10c are examples of visuals displays.

In either of the embodiments, the user interface preferably is less than a square foot in dimensions and has a monochrome or LCD screen. In other embodiments the user interface can utilize a smaller screen designed to respond to a stylus touching the screen. For example, the screen display, whatever size, displays as shown in FIG. 10a.

Preliminary settings are inputted, such as grade level and amount of time given for each correct answer. The system preferably defaults to two minutes per correct answer.

The power controller base station of the first embodiment or the display output controller base station of the second embodiment are preferably located near the electronic device being controlled, such as a television or video game. The power controller base station includes a standard power socket receptacle and a cord that plugs into a standard AC wall socket or outlet. The display output controller base station includes a standard video input and output connector, or other type of electronic display input and output connector. The power controller base station or the display output controller base station receives via electronic radiation transmissions, such as radio or Wi-fi, an amount of time earned on the user interface. The power controller base station allows electrical current to pass from the wall outlet to the electronic device, such as a TV, video game, computer, or the allotted amount of time. The display output controller base station allows display signals from the electronic device to flow through the display output controller base station to the display device.

The reward apparatus of the present invention provides a visual and an audible warning before the available time runs out, such as five minutes beforehand, thus enabling a child to save their game and logoff before the power to the electrical device or display signal to the display device is terminated. A password function can be included for overriding the system so that parents can utilize the electronic device without having to answer test questions.

The method of the present invention can be implemented as a mobile application (app) for use in blocking other apps on mobile devices, such as tablets and smartphones. Similarly, the method can be used similarly as an app for use on "smart tv's" to block other apps in a similar fashion to the mobile devices, such as blocking programs like Netflix®, in a similar fashion for apps used on desktop and laptop computers.

An app is a software application designed to fulfill a particular purpose. The Test 4 Time app is downloaded to the device to be used. As discussed, one embodiment of the present invention is downloaded to a mobile device, such as a tablet or a smartphone. Another embodiment of the present invention is used with a "smart tv", wherein a smart tv has the ability to download, store and run software applications (apps).

Another embodiment of the present invention is downloaded or installed on a desktop or laptop computer. On the "Parent Menu" page of the Test 4 Time app a parent or guardian of a child selects apps the parent or guardian wants the end user, such as a child, to be required to correctly answer educational questions to accumulate time for use of that selected app on that selected device. When the user selects one of the apps the parent has designated for blocking, the Test 4 Time appears on the screen and presents a user with age appropriate questions. The age appropriateness of the questions for each child user (if more than one) is set by the parent or guardian on another page of the "Parent Menu". After being rewarded time for every correctly answered question, the child can hit the "Play" button which sends the user to the selected app for that amount of time.

With two minutes left of the time accumulated the screen will display a "two minute warning" which will allow the user to pause the app currently being used and go back to the Test 4 Time's question section to earn more time. If the user chooses to bypass the two minute warning and let the time expire, the screen will revert to the screen where the original app choice was made by the user. The process can then start over if the user decides to engage a different app for instance. A parental passcode allows a parent to bypass the questions if they so chose.

Another embodiment of the Test 4 Time functions in conjunction with an activity tracker. An activity tracker is a device or application for monitoring and tracking fitness-related metrics such as distance walked or run, calorie consumption, and in some cases heartbeat and quality of sleep. In this embodiment, a parent is able to use another page of the parent menu to choose a certain level of activity that must be achieved to allow the use of the desired device, such as a video game console, cable box, TV, mobile device, smart tv, etc. Once the user has achieved the required level of activity a wireless connection between the activity tracker and the Test 4 Time will engage the Test 4 Time's question protocols, similar to the above description regarding mobile devices. This embodiment will also allow a parent to access the parent page and to choose how much time on the device or app should be allowed for a given amount of activity. For instance, the parent can choose to allow the device to be used after activity only. An example would be 60 minutes of game time for 2,000 steps. Another example would be that the parent can choose that 2,000 steps must be completed AND THEN the Test 4 Time questions must be answered. In this embodiment, completing the activity tracker's goal act as an "on" switch for the Test 4 Time's questions.

A further embodiment of the present invention functions in conjunction with an electronic pill dispenser. A wireless connection between the pill dispenser and the Test 4 Time requires that a daily pill taker requires a patient to take their medication before the video signal would be released to the desired device. The goal is to motivate a patient to take their daily medications. So many times life threatening situations arise because medications are forgotten. Patients in assisted living situations have daily help, but many times are just in their homes without help. Their main source of daily "entertainment" or engagement is watching TV. This embodiment of the present invention requires patients have their daily medications dispensed from the electronic pill dispenser before the video signal is released to the TV, which is reset daily.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed invention and specific embodiments as a basis for designing or modifying other structures for carrying out the same purposes of the present invention, and that such other structures do not depart from the spirit and scope of the invention in its broadest form.

DETAILED DESCRIPTION OF THE PREFERRED EMBODIMENTS

Figure 1:
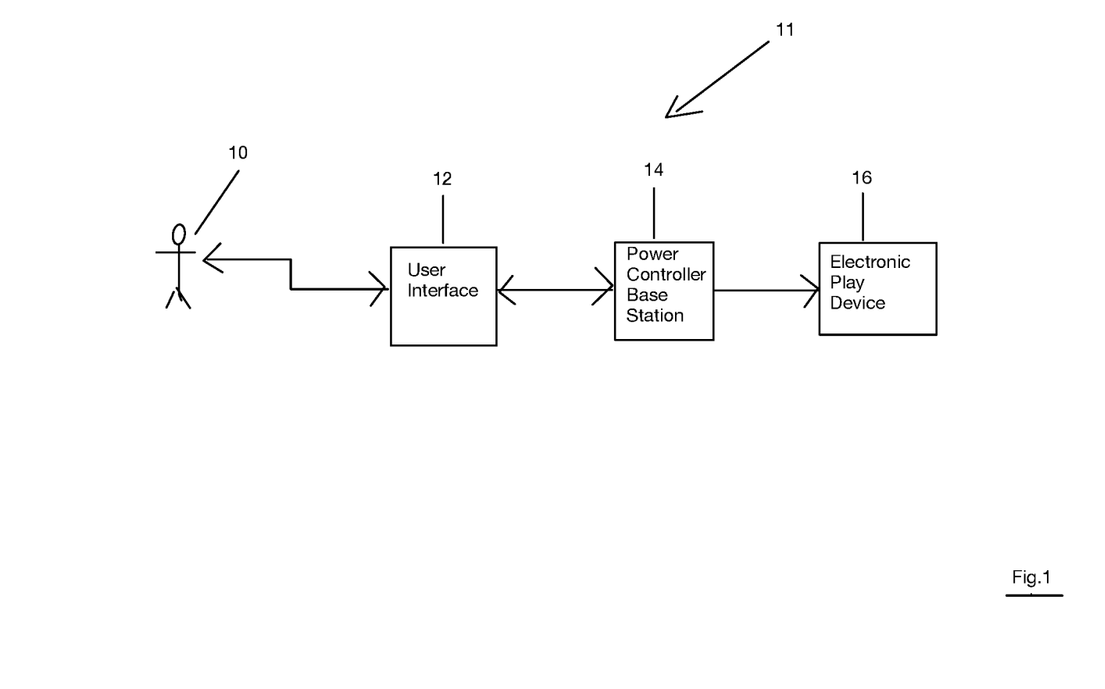
FIG. 1 is a block diagram of a playtime award apparatus configured in accordance with a preferred embodiment of the present invention.
Figure 10B:
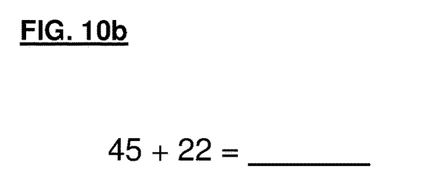

Referring now to the drawings, FIG. 1 illustrates a block diagram of a playtime awarding apparatus 11 configured in accordance with a first embodiment of the present invention. The apparatus 11 includes a user interface 12, a power controller base station 14, and an electronic play device 16. A user 10, such as a child, utilizes the user interface 12 to answer test questions and obtain playtime credits for using the electronic play device 16. A display on the user interface 12 displays a screen message, such as "Welcome to Test Time". "Let's Earn Some Fun Time". Next, the user interface 12 generates random questions for a selected educational topic. For example, if the subject is math, the user interface 12 generates random math questions, such as shown in FIG. 10b.

The user 10 enters an answer using a keypad, touch screen, or other known input device. If the answer is correct, the user interface 12 records the correct answer and generates another question. If the user 10 answers incorrectly, a new question is generated without accumulating any playtime credit. It is up to the user 10 to answer as many questions as they want up to a pre-set time limit. The user interface 12 records the number of correct answers and uses a pre-set multiplier to determine the amount of earned time, and then transmits, preferably wirelessly, the amount of earned time to the power controller base station 14. A "parental control" function is included to set the amount of earned time for each question answered correctly. Thus, if the user 10 answers 20 questions correctly and the multiplier is set at two minutes per correct response, 40 minutes of time will be earned, and that information is transmitted to the power controller base station 14. Different levels of difficulty for different ages are included.

In other embodiments, the user interface can be a commercial smart device, such as a smart phone, iPhone®, iPad®, iPod®, or other device having an input, output display, and wireless transmission capabilities. A computer software application can be downloaded to these devices and used in place of a customized built handheld user interface 12. Similarly, the user interface 12 can be programmed to have separate accounts for different users, and these separate accounts could be password protected.

The power controller base station 14 contains a standard AC power receptacle that the desired play device 16 will plug into for power, such as a video game. The power controller base station 14 also has a power cord exiting the unit that will plug into a standard AC wall socket. A button that says "FUN TIME" is included on the user interface 12. Depressing the "FUN TIME" button causes "earned" time information to be transmitted to the power controller base station 14. Using the example from above, a 40 minute credit is sent from the user interface 12 to the power controller base station 14. The power controller base station 14 then allows the electric current to flow to the electronic play device 16, such as a video game or television. A timer will count to 40 minutes and at the end of the $40^{th}$ minute the power will be cut off to the electronic play device 16 receiving power from the power controller base station 14. The counter can be in either the user interface 12 or the power controller base station 14. The user interface 12 includes an external timer on its display screen so the user 10 can always reference how much time is left in that session. To give the user 10 a chance at an uninterrupted gaming experience, at two minutes before their time is finished an alarm will sound on the user interface 12. The user 10 will have the ability to pause and save the game they are playing so more time can be earned.

Figure 2:
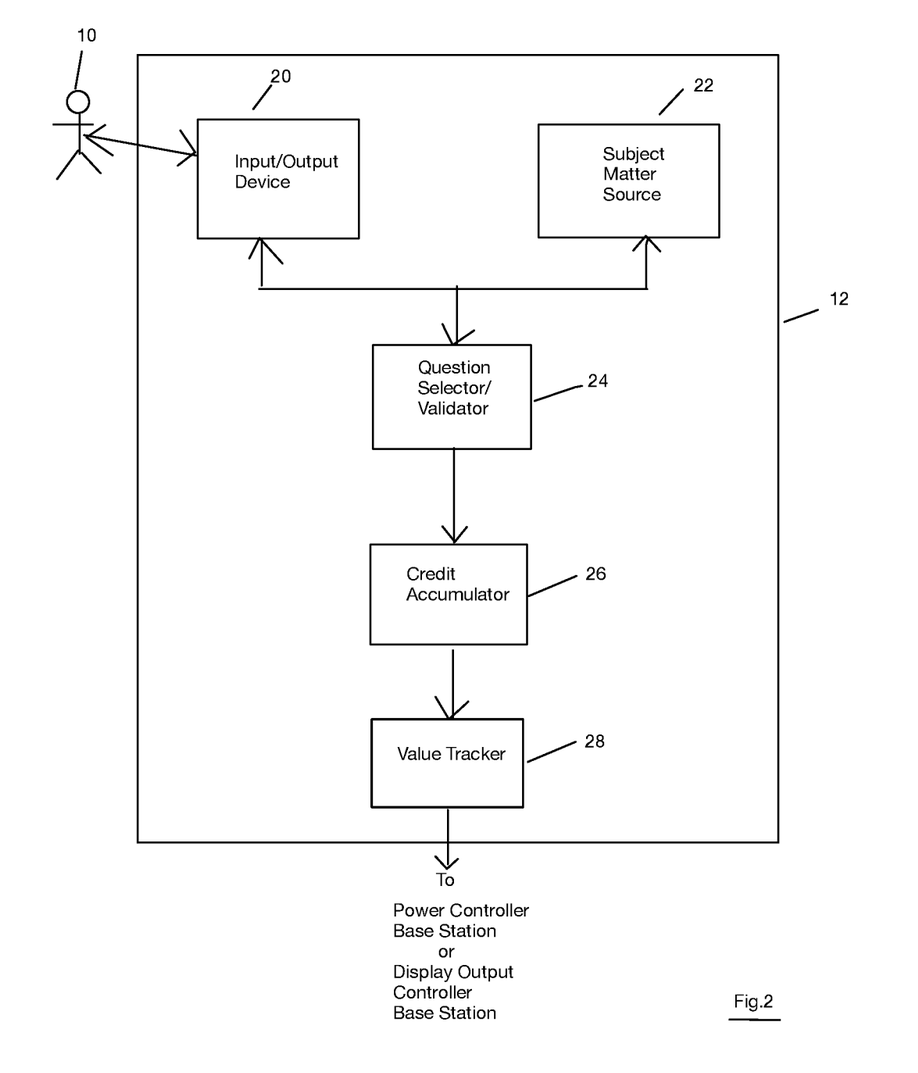
FIG. 2 is a block diagram of the user interface shown in FIG. 1.

FIG. 2 illustrates a block diagram of the user interface 12 shown FIG. 1. A user 10 interacts with the user interface 12 by via an input/output device 20, such as a keypad and liquid crystal display (LCD), on the interface 12. While a display and keypad are the preferred devices for enabling a user 10 to interact with the user interface 12, other known input and output devices can be used, such as a touch screen. A subject matter source 22 electrically connected to the input/output device stores data for questions and answers from educational subjects, such as math, science, English, social studies, geography, or any other desired subject. The subject matter source 22 further includes a random question generator for providing individual questions from an educational subject selected by the user 10.

The input/output device 20 and subject matter source 22 are both electrically connected to a question selector and validator 24. The question selector and validator 24 compares the inputted answers with each question to determine if a question was answered correctly based on data received from the subject matter source 22. A credit accumulator 26, electrically connected to the question selector and validator 24, receives a signal from the question selector and validator 24 when a question is answered correctly. The credit accumulator 26 records and tabulates a running total of the number of correctly answered questions.

A value tracker 28 is electrically connected to the credit accumulator 26. When the user 10 wants to begin playing on the electronic play device 16, the user 10 inputs a request to the user interface 12 to begin using the electronic play device 16, and the credit accumulator 26 sends a signal to the value tracker 28 providing the number of questions answered correctly. The value tracker 28 then multiplies the number of correctly answered questions by the time value assigned to each question. Thus, for example, if two minutes are assigned to each correctly answered question, and the user has accumulated 20 correctly answer questions, then the value tracker 28 sends a signal to the power controller base station 14 that the user has earned 40 minutes of playtime.

Figure 3A:
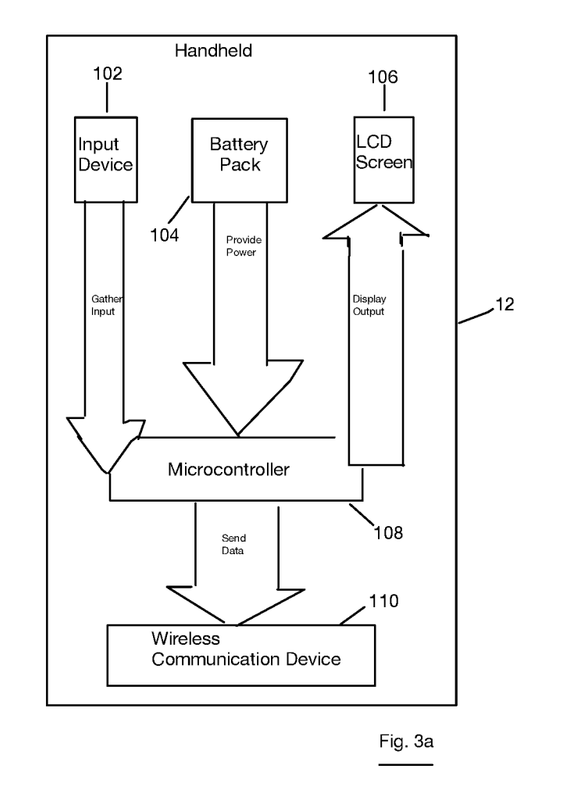
FIG. 3a is an electrical block diagram of the user interface shown in FIGS. 1 and 2.

FIG. 3a is an electrical block diagram of the user interface 12 shown in FIGS. 1 and 2. The user interface 12 is preferably designed to be handheld. The user interface 12 includes an input device 102, such as a keypad or touch screen, which is electronically connected to a microcontroller 108. A portable power source 104, such as batteries, provides power to the microcontroller 108 and other components of the user interface 12. An output device 106, such as an LCD screen, is electrically connected to the microcontroller 108. A wireless communication device 110 also is electrically connected to the microcontroller 108. The subject matter source 22, question selector and validator 24, credit accumulator 26, and value tracker 28 preferably are provided by and controlled by the microcontroller 108. The microcontroller also controls the input device 102, output device 106, and wireless communication device 110.

Figure 3B:
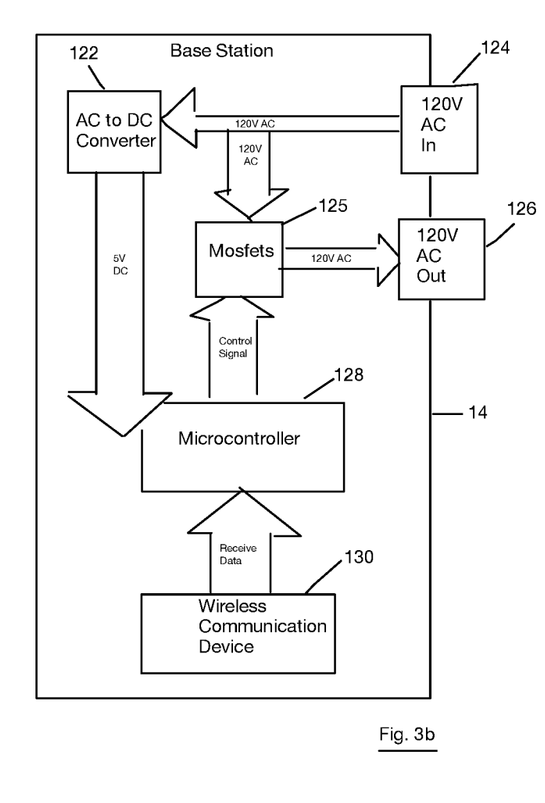
FIG. 3b is an electrical block diagram of the power controller base station shown in FIG. 1.

FIG. 3b illustrates an electrical block diagram for the power controller base station 14 shown in FIG. 1. The power controller base station 14 includes an alternating current (AC) to direct current (DC) converter 122 to provide power to a microcontroller 128. The AC to DC converter receives 120 volts AC power from a standard AC wall socket to via a 120-volts AC-in 124 connector, such as a standard power cord, to which the power controller base station 14 is connected. The 120-volts AC-in 124 also is connected to a switch or relay 125, such as a MOSFET, for allowing AC power to flow to a 120-volts AC-out socket 126 which is externally located on the power controller base station 14. A power cord from the electronic play device 16 is to be connected to the 120-volts AC-out socket 126.

The microcontroller 128 is electrically connected to the relay 125 for controlling the flow of AC power to the 120-volts AC-out socket 126. A wireless communication device 130 also is electrically connected to the microcontroller 128 for communicating received wireless transmitted data from the user interface 12.

Figure 4:
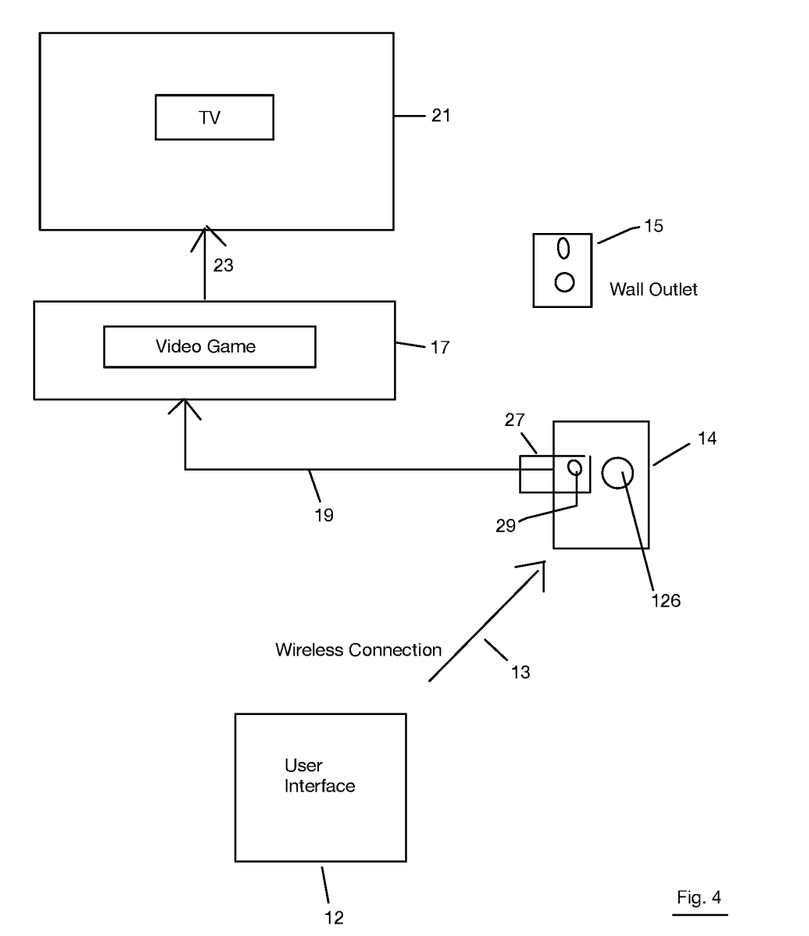
FIG. 4 is a block diagram of a layout configured in accordance with a first embodiment of the present invention.

FIG. 4 is a block diagram of a layout configured in accordance with one embodiment of the present invention. Illustrated are the user interface 12 and the power controller base station 14. The user interface 12 and the power controller base station 14 communicate via a wireless communication 13. The power controller base station 14 is connected to and powered by a standard AC wall socket 15. An electronic play device 16, here a video game 17, has its power cord 19 plugged into the 120-volts AC-out 126 external socket of the power controller base station 14. The video game 17 has a video output 23 connected to the television 21.

A lockbox 27 is attached to the power controller base station 14 and encloses a plug 29 of the power cord 19 from the video game 17. The lockbox 27 prevents the plug 29 from being removed from the power controller base station 14 by an unauthorized user and plugging in the power cord 19 directly to the wall outlet 15, thus avoiding the power controller base station 14 in order to continue playing the video game 17 after the power controller base station 14 terminates power to the video game. The lockbox 27 includes an aperture small enough for the power cord 19 to pass through, but not the plug 29. The lockbox 27 is preferably locked using a key lock.

Figure 5:
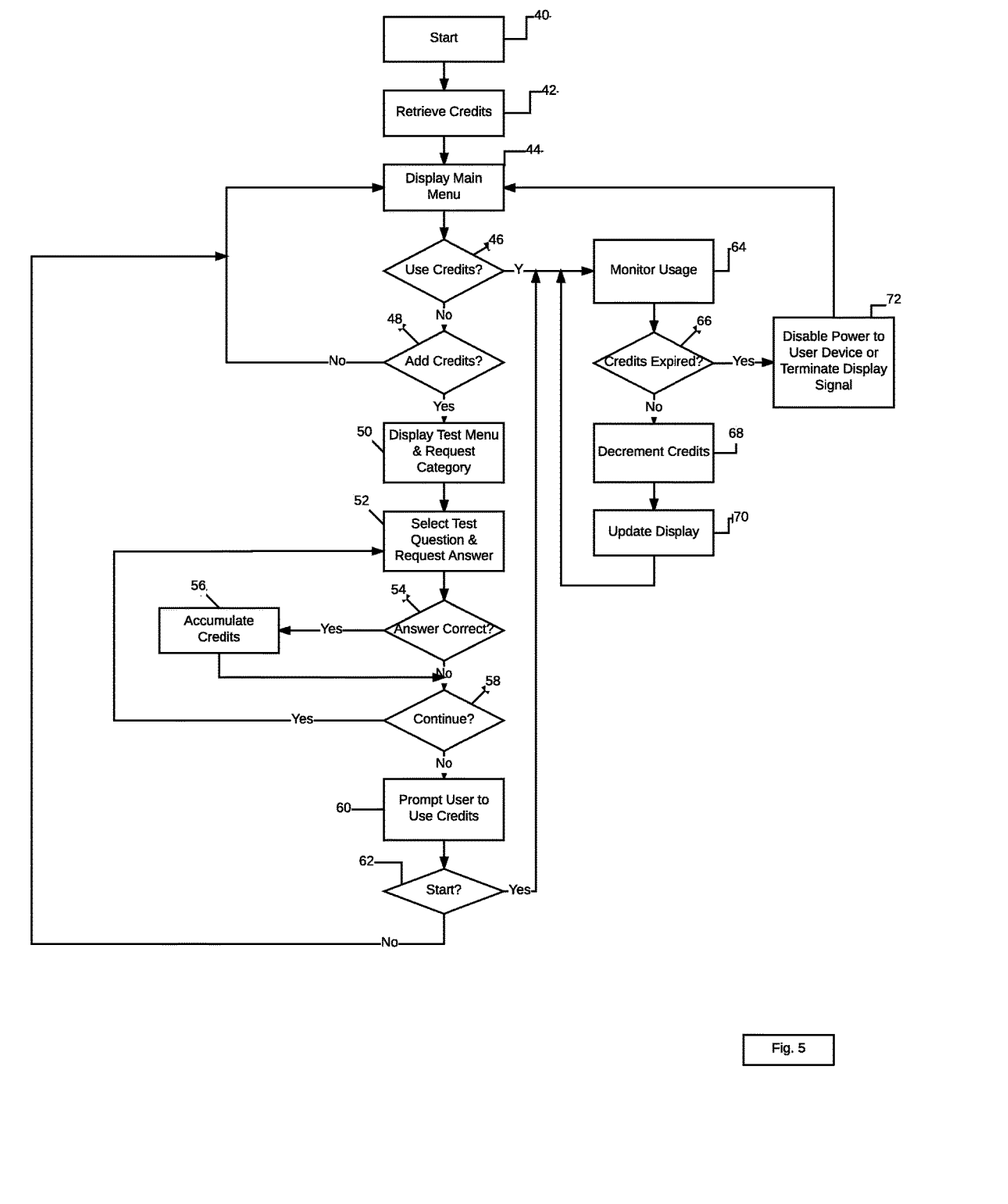
FIG. 5 is a flowchart of a preferred method of the present invention.

FIG. 5 is a flowchart of the preferred method of the present invention. Beginning at Start 40, the process next retrieves the current total of credits for questions answered correctly at step 42, and then displays the total credits at step 44. If the user 10 elects not to use available credits next at step 46, the process proceeds to step 48 and inquires if the user wants to add credits. If the user selects no, the process returns to step 44, and if the user selects yes to adding credits, the process proceeds to step 50 wherein the system displays test menu and requests an educational test category, such as math, geography, or science. The process next moves to step 52 wherein the user 10 selects the educational test category, and the system displays a test question and the user 10 enters his or her answer to the question. The format for the questions can be fill-in the blank or multiple choice, depending upon the subject matter.

The process moves next to step 54 to determine if the entered answer was correct. If the answer was correct, the process proceeds to step 56 to accumulate credits, and then to step 58. If an incorrect answer is entered, the process moves directly to step 58. At step 58 the process inquires if the user desires to answer more questions to gain additional credits. If the user selects yes, the process returns to step 52; and if the user selects no, the process moves directly to step 60. At step 60 the system prompts the user to use credits. Next, at step 62, if the user inputs no to using credits, the process returns to the main menu at step 44; if the user desires to use acquired credits at step 62, the process proceeds to step 64.

The process moves to step 64 in response to the user selecting yes to use acquired credits at step 62 or selecting yes to use credits at step 46, discussed above. At step 64, the process begins supplying electricity to the electronic play device 16, such as a video game, or providing an output display signal to a display device, such as a television. The process moves next to step 66 to check if the credits are still available after using the first increment of time, which for example, could be 2 minutes. So, if each credit is good for 2 minutes, 20 credits would allow 40 minutes of playtime. The system would then check every two minutes to determine of time credit is still available. If credits are still available, the system move to step 68 to decrement a credit; if no credits are left at step 66, the process moves to step 72 to disable power to the electronic play device 16 or stop feeding the display signal to the device. From step 72, the system proceeds back to the main menu at step 44.

If credits are still available at step 66, the process proceeds to step 68 to decrement a single credit. If there is only one credit left at step 68, the system issues an audio alert and a visual alert on the output device 106 of the user interface 12 to alert the user that time is running out, and the user should save the game and logout. From step 68, the system proceeds to 70 wherein the system updates the display on the output device 106 to keep the user 10 advised of the available time left. From step 70, the process returns to step 64, and the process continues until the time credits are used up or the user inputs on the user interface 12 that he or she desires to terminate play before all the available playtime credits have been used.

Figure 6A:
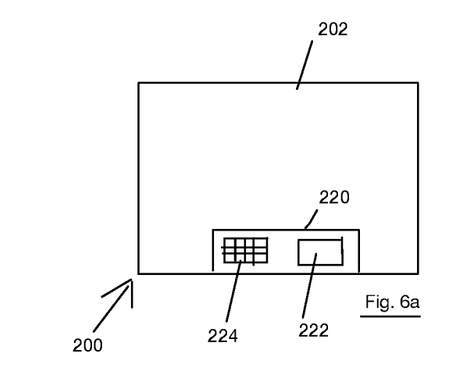
FIG. 6a is a top view of a lockbox configured in accordance with another embodiment of the present invention.

FIG. 6a illustrates a top view of a lockbox 200 configured in accordance with another embodiment of the present invention. A lid 202 is shown having a user interface 220 with a display 222 and an input keypad 224 secured to the lid 202. The user interface 220 includes an electronic lock for securing the lid 202 to the bottom 204 (FIGS. 6b and 6c) of the lockbox. The lockbox 200 is sized to receive multiple handheld electrically powered games. Access to the lockbox 200 is gained by answering a predetermined number of educational questions on a user interface 220 to open the lockbox 200 and be able to take out electronic toys stored inside. The user interface 220 is similar to the user interface 12, except the user interface 200 unlocks the lockbox 200 instead of transmitting data to the power controller base station 14 when a predetermined number of correct answers are achieved by a user.

Figure 6B:
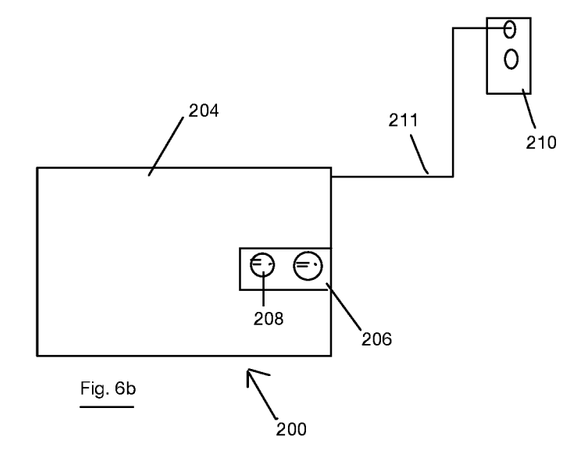
FIG. 6b is a top view of the lockbox shown in FIG. 6a with the top open.

FIG. 6b is a top view of the lockbox 200 with the lid 202 opened or removed, and exposing the bottom 204 of the lockbox 200. Inside the lockbox 200 on the bottom 204 is a power strip 206 having multiple power outlets 208. During the evening and/or when the lockbox is closed with one or more electronic toys inside, the electronic toys are plugged into the sockets 208 of the power strip 206 to charge. The power strip 206 receives power from a wall socket 210 external and separate from the lockbox 200. A power cable 211 from the lockbox 200 is plugged into the wall socket 210 to provide power to the power strip 206.

Figure 6C:
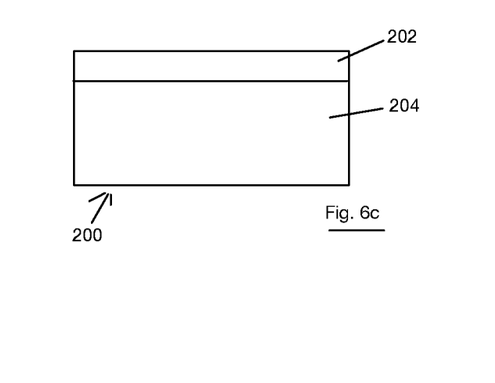
FIG. 6c is a side view of the lockbox shown in FIGS. 6a and 6b.

FIG. 6c is a side view of the lockbox 200 shown in FIGS. 6a and 6b. The bottom 204 and the lid 202 of the lockbox 200 shown in FIGS. 6a and 6b are illustrated.

Figure 7:
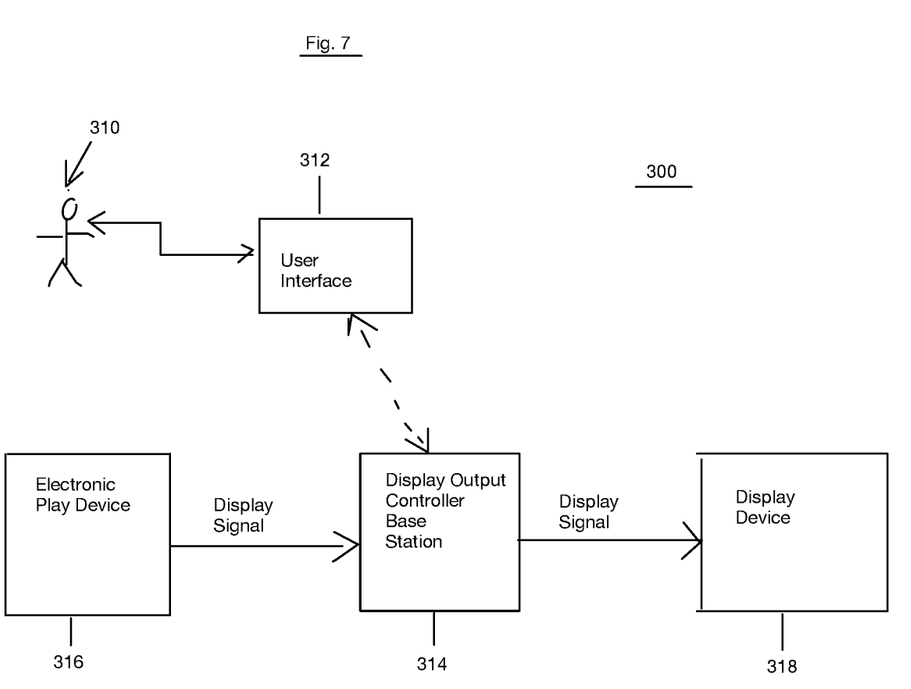
FIG. 7 is a block diagram of a layout configured in accordance with another embodiment of the present invention.
Figure 10C:
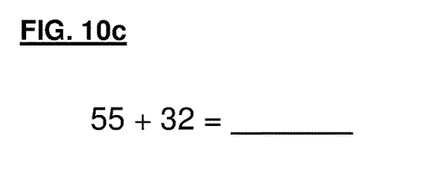

FIG. 7 illustrates a block diagram layout 300 of another embodiment of the present invention. A user 310 is shown having a user device 312, similar to user device 12. An electronic play device 316, such as a video game, has it video display output signal connected to a display output controller base station 314. The display output controller base station 314 is electrically connected to a display device 318, such as a television. A user 310, such as a child, utilizes the user interface 312 to answer test questions and obtain playtime credits for using the electronic play device 316. A display on the user interface 312 displays a screen message, such as "Welcome to Test 4 Time". "Let's Earn Some Fun Time". Next, the user interface 312 generates random questions for a selected educational topic. For example, if the subject is math, the user interface 312 generates random math questions, such as shown in FIG. 10c.

The user 310 enters an answer using a keypad, touch screen, or other known input device. If the answer is correct, the user interface 312 records the correct answer and generates another question. If the user 310 answers incorrectly, a new question is generated without accumulating any playtime credit. It is up to the user 310 to answer as many questions as they want up to a pre-set time limit. The user interface 312 records the number of correct answers and uses a pre-set multiplier to determine the amount of earned time, and then transmits, preferably wirelessly, the amount of earned time to the display output controller base station 14. A "parental control" function is included to set the amount of earned time for each question answered correctly. Thus, if the user 310 answers 20 questions correctly and the multiplier is set at two minutes per correct response, 40 minutes of time will be earned, and that information is transmitted to the display output controller base station 314. Different levels of difficulty for different ages are included.

In other embodiments, the user interface can be a commercial smart device, such as a smart phone, iPhone®, iPad®, iPod®, or other device having an input, output display, and wireless transmission capabilities. A computer software application can be downloaded to these devices and used in place of a customized built handheld user interface 312. Similarly, the user interface 312 can be programmed to have separate accounts for different users, and these separate accounts could be password protected.

The display output controller base station 314 contains a standard display input, such as a "Video In" port that will electrically connect to the "Video Out" port of the desired play device 316, such as a video game. The display output controller base station 314 preferably receives power from a standard AC wall socket. A button that says "FUN TIME" is included on the user interface 312. Depressing the "FUN TIME" button causes "earned" time information to be transmitted to the display output controller base station 314. Using the example from above, a 40 minute credit is sent from the user interface 312 to the display output controller base station 314. The display output controller base station 314 then allows the video display output to pass from the Video_Out port of the electronic play device 316, though the display output controller base station 314, and to the Video_In port of the display device 318, such as a video monitor or a television. A timer will count to 40 minutes and at the end of the 40$^{th}$ minute the display output controller base station 314 will prevent the display signal from passing through to the display device 318. The counter can be in either the user interface 312 or the display output controller base station 314. The user interface 312 includes an external timer on its display screen so the user 310 can always reference how much time is left in that session. To give the user 310 a chance at an uninterrupted gaming experience, at two minutes before their time is finished an alarm will sound on the user interface 312. The user 310 will have the ability to pause and save the game they are playing so more time can be earned.

Figure 8A:
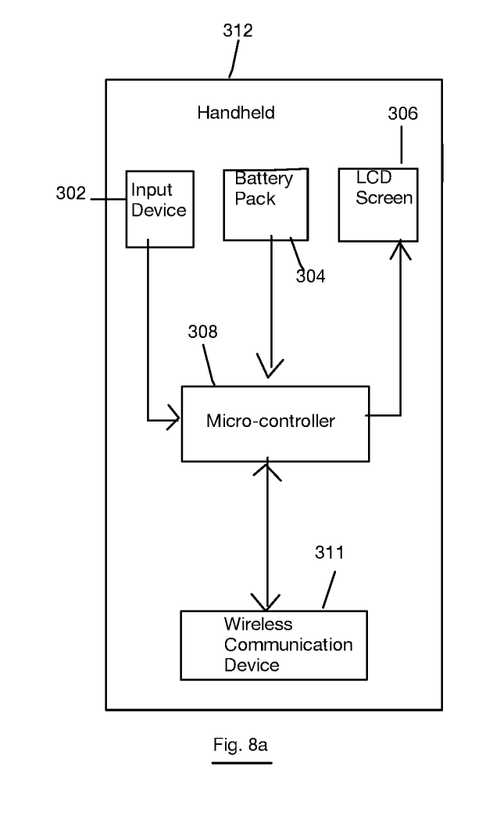
FIG. 8a is an electrical block diagram of the user interface shown in FIG. 7.

FIG. 8a is an electrical block diagram of the user interface 312 shown in FIG. 7. The user interface 312 is preferably designed to be handheld device. The user interface 12 includes an input device 302, such as a keypad or touch screen, which is electronically connected to a microcontroller 308. A portable power source 304, such as batteries, provides power to the microcontroller 308 and other components of the user interface 312. An output device 306, such as an LCD screen, is electrically connected to the microcontroller 308. A wireless communication device 311 also is electrically connected to the microcontroller 308. The subject matter source 322, question selector and validator 324, credit accumulator 326, and value tracker 328 preferably are provided by and controlled by the microcontroller 308. The microcontroller also controls the input device 302, output device 306, and wireless communication device 311.

Figure 8B:
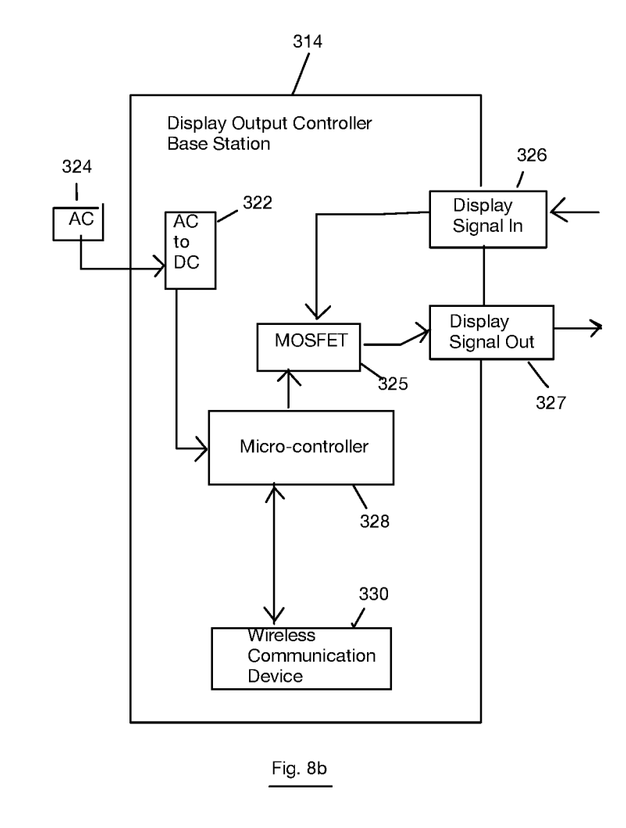
FIG. 8b is an electrical block diagram of the output display controller base station shown in FIG. 7.

FIG. 8b illustrates an electrical block diagram for the display output controller base station 314 shown in FIG. 7. The display output controller base station 314 includes an alternating current (AC) to direct current (DC) converter 322 to provide power to a microcontroller 328. The AC to DC converter 322 receives 120 volts AC power from a standard AC wall socket to via a 120-volts AC-in 324 connector, such as a standard power cord, to which the display output controller base station 314 is connected. A Display Signal In (such as Video_In) port 326 located on the outer surface of the display output controller base station 314 is electrically connected to a switch or relay 325, such as a MOSFET, for allowing an output display signal from an electronic game device to flow through the display output controller base station 314 to a Display Signal Out (such as Video_Out) port 327 on the outer surface of display output controller base station 314 to a display device 318. The microcontroller 328 is electrically connected to the relay 325 for controlling the passage of a display signal from the Display Signal In port 326 to the Display Signal Out port 327. A wireless communication device 330 also is electrically connected to the microcontroller 328 for communicating received wireless transmitted data from the user interface 312.

Figure 9:
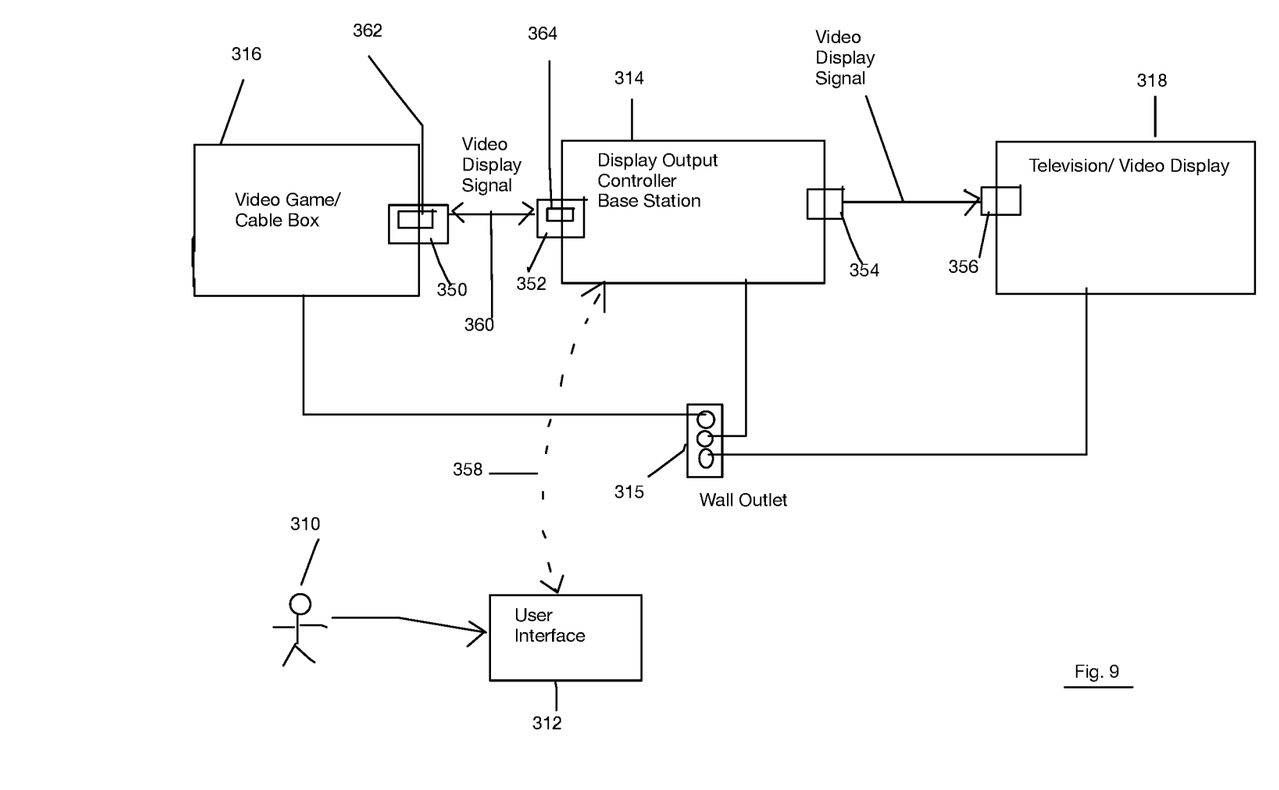
FIG. 9 is a block diagram of a layout configured in accordance with another embodiment of the present invention.

FIG. 9 is a block diagram system layout configured in accordance with another embodiment of the present invention. A display signal output port 350 of the video game 316 is electrically connected via a wire cable to the display signal input port 352 of the display output controller base station

314. A display signal output port 354 of the display output controller 314 is electrically connected via a wire cable to a display input port 356 of a television 318. The display signal ports 350, 352, 354, and 356 preferably are standard video, RGB, or HDMI connector ports. Similar to the user interface 12 and the power controller base station 14, the user interface 312 preferably communicates with the display output controller base station 314 via a wireless signal 358.

In accordance with the present invention, the display signal output port 350 and the display signal input port 352 both include plug cable locks in order to prevent the plug 362 or the plug 364 on the display signal cable 360 from being disconnected in order to avoid the display output controller base station from terminating a player's use of the video game 316. The ports 350 and 352 include video port locks such as the Targus PA492U DEFCON VPCL—Video Port Combination lock to prevent the plugs 362 and 364 from being removed by unauthorized users.

While specific embodiments have been shown and described to point out fundamental and novel features of the invention as applied to the preferred embodiments, it will be understood that various omissions and substitutions and changes of the form and details of the invention illustrated and in the operation may be done by those skilled in the art, without departing from the spirit of the invention.

The invention claimed is:

1. A method for awarding time usage credits on an electronic device having a display signal output proportional to correct answers to educational questions on a user interface before any interaction with the electronic device is permitted to occur, said method comprising the steps of:
   providing a display output controller base station, wherein the user interface communicates wirelessly with the display output controller base station;
   wherein the display output controller base station includes a display signal input and a display signal output, and a switch connected between the display signal input and the display signal output for enabling and preventing a display signal to pass between the display signal input and the display signal output;
   wherein the user interface includes an input for receiving input from a user and an output for wirelessly communicating the input from the user to the display output controller base station;
   providing a display having a display signal input;
   connecting directly the display signal output of the electronic device to the display signal input of the display output controller base station, and connecting directly the display signal output of the display output controller base station to the display signal input of the display, wherein the display output controller base station enables a display signal to pass to the display from the electronic device only after educational questions have been answered correctly on the user interface;
   entering a request into the user interface for the educational question to be displayed on the user interface;
   displaying on the user interface the educational question to be answered correctly in response to the request into the user interface for an educational question to be displayed;
   storing a time usage credit in the user interface based proportionally upon a correct answer being entered into the user interface in response to the displayed educational question;
   displaying on the user interface an inquiry to a user for additional educational questions to be displayed; and
   enabling the display signal from the electronic device to pass directly to the display from the electronic device for a time period corresponding to the stored time usage credit.

2. The method of claim 1, further comprising the steps of:
   displaying on the user interface the additional educational question to be answered correctly in response to the request entered into the user interface for the additional educational question to be displayed;
   storing additional time usage credit in the user interface based proportionally upon a correct answer being entered into the user interface in response to the displayed additional educational question; and
   enabling the display signal to pass to the display from the electronic device for a time period corresponding to the additional stored time usage credit.

3. The method of claim 1, further comprising the step of:
   interrupting the display signal passing to the display of the electronic device after the time period runs out.

4. The method of claim 1, wherein the user interface includes a credit accumulator for storing a total of educational questions answered correctly.

5. The method of claim 1, wherein the electronic device is an electronic game device.

6. The method of claim 1, further comprising the step of:
   sounding an audible alarm from the user interface based upon time period available left to play being below a predetermined minimum value.

7. The method of claim 6, further comprising the step of:
   displaying on the user interface a correct answer based upon an incorrect answer being inputted into the user interface in response to the education question being displayed on the user interface.

8. The method of claim 6, further comprising the step of:
   entering a request into the user interface for an educational question to be displayed on the user interface based up the sounding of the audible alarm indicating the time period available left to play being below the predetermined minimum.

9. The method of claim 7, further comprising the step of:
   displaying another education question on a display of the user interface based upon the incorrect answer being inputted in the user interface.

10. The method of claim 1, further comprising:
    entering a command into the user interface for the display signal to pass to the display of the electronic device based upon the available stored time usage credit.

11. The method of claim 1, wherein the controller base station and the user interface are connected together via a hardwire connection.

12. The method of claim 1, wherein the controller base station and the user interface communicate via a wireless connection.

13. The method of claim 1, wherein the switch includes a MOSFET.

14. The method of claim 1, wherein the display is a monitor.

15. The method of claim 1, wherein the display is a television.

16. A method for awarding time usage credits on an electronic device having a power supply input proportional to correct answers to educational questions on a user interface before any interaction with the electronic device is permitted to occur, said method comprising the steps of:
    providing a power controller base station having a power input and a power output, wherein the user interface communicates with the power controller base station, and the user interface includes an input device for receiving input from a user and an output for electronically communicating the input from the user to the power controller base station;

connecting the power supply input of the electronic device to the power output of the power controller base station, and connecting the power input of the power controller base station to an AC power outlet, wherein the power controller base station enables electrical power pass to pass from the AC power outlet to the power supply input on the electronic device only after educational questions have been answered correctly on the user interface;

entering a request into the user interface for the educational question to be displayed on the user interface;

displaying on the user interface the educational question to be answered correctly in response to the request into the user interface for an educational question to be displayed;

storing a time usage credit in the user interface based upon a correct answer being entered into the user interface in response to the displayed educational question;

displaying on the user interface an inquiry to a user for additional educational questions to be displayed; and enabling the electrical power to pass from the AC power outlet to the power supply input of the electronic device for a time period corresponding to the stored time usage credit.

\* \* \* \* \*